(12) United States Patent
Jeansonne et al.

(10) Patent No.: US 11,914,713 B2
(45) Date of Patent: Feb. 27, 2024

(54) ACCESS TO FIRMWARE SETTINGS WITH ASYMMETRIC CRYPTOGRAPHY

(71) Applicant: Hewlett-Packard Development Company, L.P., Spring, TX (US)

(72) Inventors: Jeffrey Kevin Jeansonne, Spring, TX (US); Valiuddin Ali, Spring, TX (US); Richard Alden Bramley, Jr., Mansfield, MA (US); Adrian John Baldwin, Bristol (GB); Joshua Serratelli Schiffman, Bristol (GB)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 233 days.

(21) Appl. No.: 17/052,991

(22) PCT Filed: Feb. 28, 2019

(86) PCT No.: PCT/US2019/020143
§ 371 (c)(1),
(2) Date: Nov. 4, 2020

(87) PCT Pub. No.: WO2020/176110
PCT Pub. Date: Sep. 3, 2020

(65) Prior Publication Data
US 2021/0382996 A1  Dec. 9, 2021

(51) Int. Cl.
*G06F 21/57* (2013.01)
*G06F 21/36* (2013.01)
(Continued)

(52) U.S. Cl.
CPC ............ *G06F 21/572* (2013.01); *G06F 21/36* (2013.01); *H04L 9/3228* (2013.01);
(Continued)

(58) Field of Classification Search
CPC ..... G06F 21/572; G06F 21/36; H04L 9/3228; H04L 9/3247; H04L 63/0838
See application file for complete search history.

(56) References Cited

U.S. PATENT DOCUMENTS 6,633,981 B1 * 10/2003 Davis ..................... G06F 21/57
713/185
7,900,252 B2    3/2011 Kawano et al.
(Continued)

FOREIGN PATENT DOCUMENTS

CN  106648591  5/2017
EP  2372597 A1  10/2011

*Primary Examiner* — Jaweed A Abbaszadeh
*Assistant Examiner* — Cheri L Harrington
(74) *Attorney, Agent, or Firm* — Knobbe, Martens, Olson & Bear, LLP

(57) ABSTRACT

An example computing device includes a user interface, a network interface, a non-volatile memory, a processor coupled to the user interface, the network interface, and the non-volatile memory, and a set of instructions stored in the non-volatile memory. The set of instructions, when executed by the processor, is to perform a hardware initialization of the computing device according to a setting, establish a local trust domain and a remote trust domain, use a local-access public key to issue a challenge via the user interface to grant local access to the setting, and use a remote-access public key to grant remote access via the network interface to remote access to the setting.

15 Claims, 7 Drawing Sheets

(51) Int. Cl.
  *H04L 9/32* (2006.01)
  *H04L 9/40* (2022.01)
(52) U.S. Cl.
  CPC ........ *H04L 9/3247* (2013.01); *H04L 63/0838* (2013.01); *G06F 2221/033* (2013.01)

(56) References Cited

U.S. PATENT DOCUMENTS

| | | |
|---|---|---|
| 9,563,773 B2 | 2/2017 | Barkelew et al. |
| 10,069,623 B2* | 9/2018 | Garay ................... H04L 9/0841 |
| 2003/0084342 A1* | 5/2003 | Girard ................... G06F 21/575 |
| | | 726/4 |
| 2005/0044363 A1 | 2/2005 | Zimmer et al. |
| 2007/0174410 A1 | 7/2007 | Croft et al. |
| 2010/0192197 A1 | 7/2010 | Nadalin et al. |
| 2011/0161644 A1 | 6/2011 | Nojiri et al. |
| 2011/0246757 A1* | 10/2011 | Prakash ................ G06F 21/575 |
| | | 713/168 |
| 2013/0019281 A1 | 1/2013 | Jacobs et al. |
| 2014/0325639 A1 | 10/2014 | Hori |
| 2015/0047022 A1 | 2/2015 | Von der Lippe et al. |
| 2015/0058920 A1 | 2/2015 | Burghart |
| 2015/0244716 A1 | 8/2015 | Potlapally et al. |
| 2016/0021040 A1* | 1/2016 | Frei .................... H04L 61/5061 |
| | | 709/224 |
| 2017/0019396 A1* | 1/2017 | Bettenburg ............ G06F 21/42 |
| 2017/0134346 A1 | 5/2017 | Pahl et al. |
| 2017/0168851 A1* | 6/2017 | Lin ........................ G06F 8/654 |

\* cited by examiner

ACCESS TO FIRMWARE SETTINGS WITH ASYMMETRIC CRYPTOGRAPHY

BACKGROUND

Computing devices, such as desktop computers, notebook computers, servers, tablet computers, and smartphones, often include firmware stored in non-volatile memory. When a computing device is booted, the firmware may initialize hardware of the computing device and start runtime services that may be used by an operating system or application executed by the computing device.

Firmware may be configured to initialize hardware and execute other boot processes based on the selection of various firmware settings for a computing device.

DETAILED DESCRIPTION

Local and remote domains are established to provide secure access to firmware settings of a target computing device. A local domain is established by a public key at the target computing device and a corresponding private key accessible to a portable computing device used by a local user who is to access a firmware setting. The local user is authenticated by a challenge-response process executed between the target computing device and the local user's portable computing device and facilitated by the local user. The challenge-response process proves that a local user is authorized. A remote domain is established by a different public key at the target computing device and a corresponding private key accessible to a networked computing device used by a remote user. A request to change a firmware setting by the remote user is digitally signed and the computing device authenticates the request using the public key. Thus, distinct and different local and remote trust domains may be used to adjust firmware settings of a computing device, thereby allowing greater flexibility in the management of firmware settings. For example, firmware settings of localized security concern may be limited to the local trust domain, whereas other firmware settings may be in the remote trust domain. Moreover, isolation of remote and local domains may increase overall security. For example, if a local domain's private key is compromised, that key may not be able to be used to make changes through the remote domain. Hence, a security breach that affects a local domain can be more readily contained to reduce the risk that the breach expands into a wider breach via the remote domain.

Figure 1:
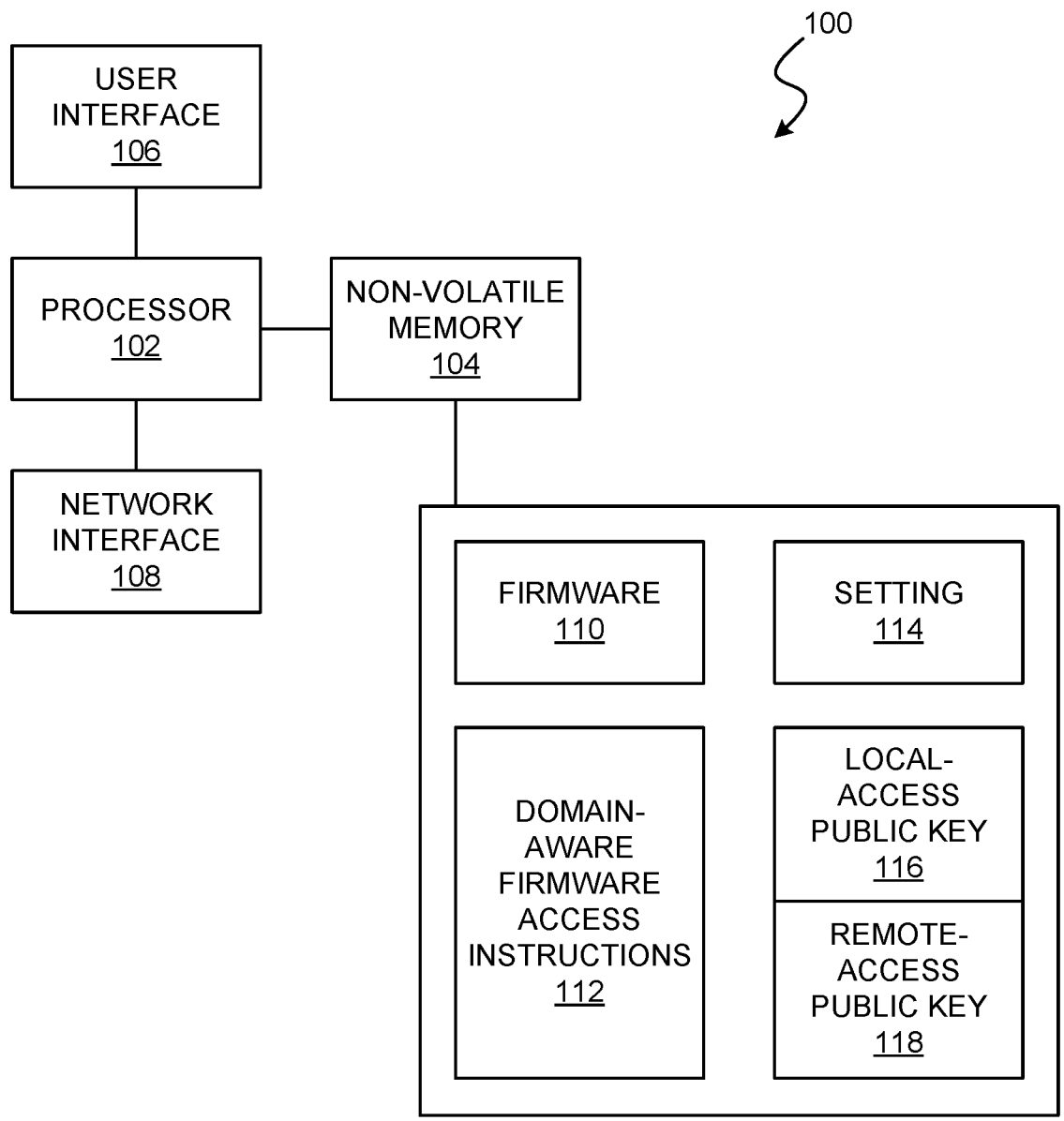
FIG. 1 is a block diagram of an example computing device to provide local and remote trust domains to access a firmware setting.

FIG. 1 shows an example computing device 100. The computing device 100 may be a desktop computer, server, notebook computer, tablet computer, smartphone, or similar device.

The computing device 100 includes a processor 102, memory 104, a user interface 106, and a network interface 108. The computing device 100 may include other components not illustrated for sake of clarity, such as a mass storage device (e.g., hard drive, solid-state drive, etc.), power supply, and the like.

The computing device 100 further includes a set of instructions including firmware instructions 110 and domain-aware firmware access instructions 112. Firmware instructions 110 may implement Basic Input/Output System (BIOS) or Unified Extensible Firmware Interface (UEFI). The set of instructions 110, 112 may be contiguous, such as monolithic firmware image that includes domain-aware firmware access instructions, and may be stored in the memory 104. The set of instructions 110, 112 may be separated into different parts that may be stored in different memories 104. Communication between separate sets of instructions 110, 112 may use message passing or similar technique.

The memory 104 is a non-transitory computer-readable medium that includes non-volatile memory, such as Electrically Erasable Programmable Read-Only Memory (EEPROM), flash memory, or similar type of memory that is capable of preserving its content without external power.

The processor 102 is coupled to the user interface 106, the network interface 108, and the non-volatile memory 104. The processor 102 may be referred to as a central processing unit (CPU) and may execute the firmware instructions 110, the domain-aware firmware access instructions 112, an operating system, and application programs.

The firmware instructions 110 may perform a hardware initialization, test hardware components, load a boot loader from a mass storage device to initialize an operating system, provide runtime services to an operating system or application, and provide similar functions to the computing device 100. The firmware instructions 110 may operate according to a setting 114, which may be stored in the memory 104. Example settings 114 include a selection of a boot device (e.g., hard drive, external memory device, network, etc.), a boot device order, CPU operating frequency, operating voltage, peripheral device settings, display settings, power management settings, fan/cooling settings, wake-on-LAN, and similar.

The domain-aware firmware access instructions 112 establish a local trust domain and a remote trust domain. The local and remote trust domains are separate domains that provide distinct and different access processes.

A local-access public key 116 is provided to the computing device 100 to manage local access to the firmware setting 114, such as access through the user interface 106. The local-access public key 116 may be stored in the memory 104. The local-access public key 116 accords with an asymmetric cryptographic scheme (e.g., RSA, elliptic curve, etc.) and corresponds to a local private key that is stored elsewhere.

A remote-access public key 118 is provided to the computing device 100 to manage remote access to the firmware setting 114, such as access through the network interface 108. The remote-access public key 118 may be stored in the memory 104. The remote-access public key 118 accords with an asymmetric cryptographic scheme and corresponds to a remote private key that is stored elsewhere. The same asymmetric cryptographic scheme may be used for both the local and remote keys.

The domain-aware firmware access instructions 112 use the local-access public key 116 to issue a challenge via the user interface 106 to grant local access to the setting 114. An example local challenge includes displaying a code at a display device of the user interface 106 to request user input of a response via the user interface 106.

An example user interface 106 is a human-device interface that provides for communication between a human user and a computing device, such as via human input into the device and via device output to the human user. A user may therefore provide information to the device and the device may provide information to the user. An example user interface 106 may include any number of different components, which may function singularly or in cooperation, such as a keyboard, keypad, mouse, trackpad, display, touchscreen, speaker, microphone, or similar component.

The domain-aware firmware access instructions 112 use the remote-access public key 118 to authenticate signed settings changes received via the network interface 108 from remote devices.

The network interface 108 allows for connection to a local-area network, wide-area network, the internet, or similar computer network to facilitate remote interaction with the computing device 100. An example network interface 108 includes a network interface device, such as a network card or chipset, at a computing device. The network interface device provides physical access to a computer network using wired or wireless signals. The computing device may include a driver that controls operation of the network interface device. Various protocols, such as Transmission Control Protocol (TCP), Internet Protocol (IP), User Datagram Protocol (UDP), and similar may be used to facilitate data communications with the network interface 108.

The different access processes used for remote and local access to the setting 114 may provide for increased security. For example, a user with specific local access may not have the same remote access and thus may be required to be physically present at the computing device 100 to change a critical setting. In another example, a trusted admin may be given wide-ranging remote access to solve large-scale problems (e.g., upgrading the firmware), while local admins may be given local access of limited scope to solve smaller-scope problems (e.g., replacing a hard drive).

Figure 2:
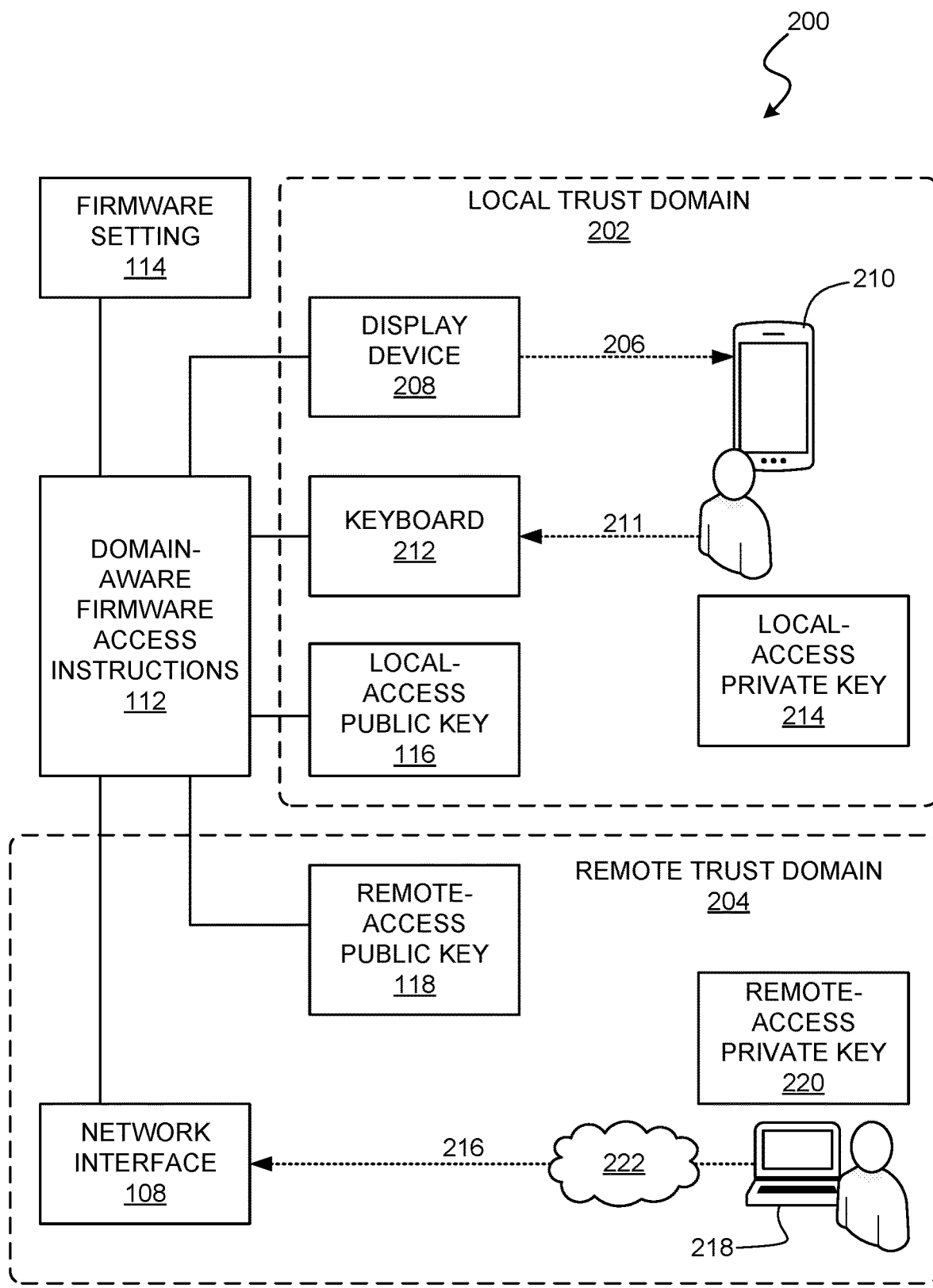
FIG. 2 is a schematic block diagram of example domain-aware firmware access instructions establishing a local trust domain and a remote trust domain.

FIG. 2 shows an example system 200, in which a set of domain-aware firmware access instructions 112 establish a local trust domain 202 and a remote trust domain 204 for access to a firmware setting 114.

In the local trust domain 202, the domain-aware firmware access instructions 112 may issue a local challenge 206 at a display device 208. For example, the local challenge 206 may be the display of a machine-readable graphical rendering, such as a barcode or two-dimensional barcode (e.g., QR code, color barcode, etc.), that may be captured by a camera of a portable computing device 210 (e.g., smartphone) possessed by a local user and physically present at the computing device 100. The domain-aware firmware access instructions 112 may monitor for a response 211 to the challenge 206 at a user-input device, such as a keyboard 212. An example response 211 is the typing of a password that meets the challenge 206. The domain-aware firmware access instructions 112 may use the local-access public key 116 to generate the local challenge 206 and grant access to the user that provides as response 211 that proves possession of or access to the corresponding local private key 214. For example, the local user's computing device 210 may decode a QR code, use the local private key 214 to decrypt the encrypted password contained in the QR code, and display the password to the local user for him/her to enter with the keyboard 212. A local user that succeeds in being granted local access uses the user interface available to the domain-aware firmware access instructions 112, such as the keyboard 212 and display device 208, to access the firmware setting 114.

It should be noted that a password, as discussed herein, is any human-intelligible information that may be manually entered into a computer. A password may include a personal identification number (PIN), a string of alphabetic and/or numeric characters, or similar. Further, the password is dynamically generated when a challenge is to be issued and is not intended to be reused. The password may be referred to as a one-time password.

In the remote trust domain 204, the domain-aware firmware access instructions 112 may authenticate a remote request 216 to change a firmware setting received from a remote user's computing device 218 through the network interface 108. For example, the remote request 216 may be signed by a remote private key 220 stored at or accessible to the remote user's computing device 218. A signed request 216 may then be authenticated by a remote-access public key 118 accessible to the domain-aware firmware access instructions 112. A signed request 216 may also identify the setting and a new value for the setting. A remote user may thus use his/her computing device 218 to sign and communicate changes to the firmware setting 114 remotely, via a computer network 222.

Figure 3:
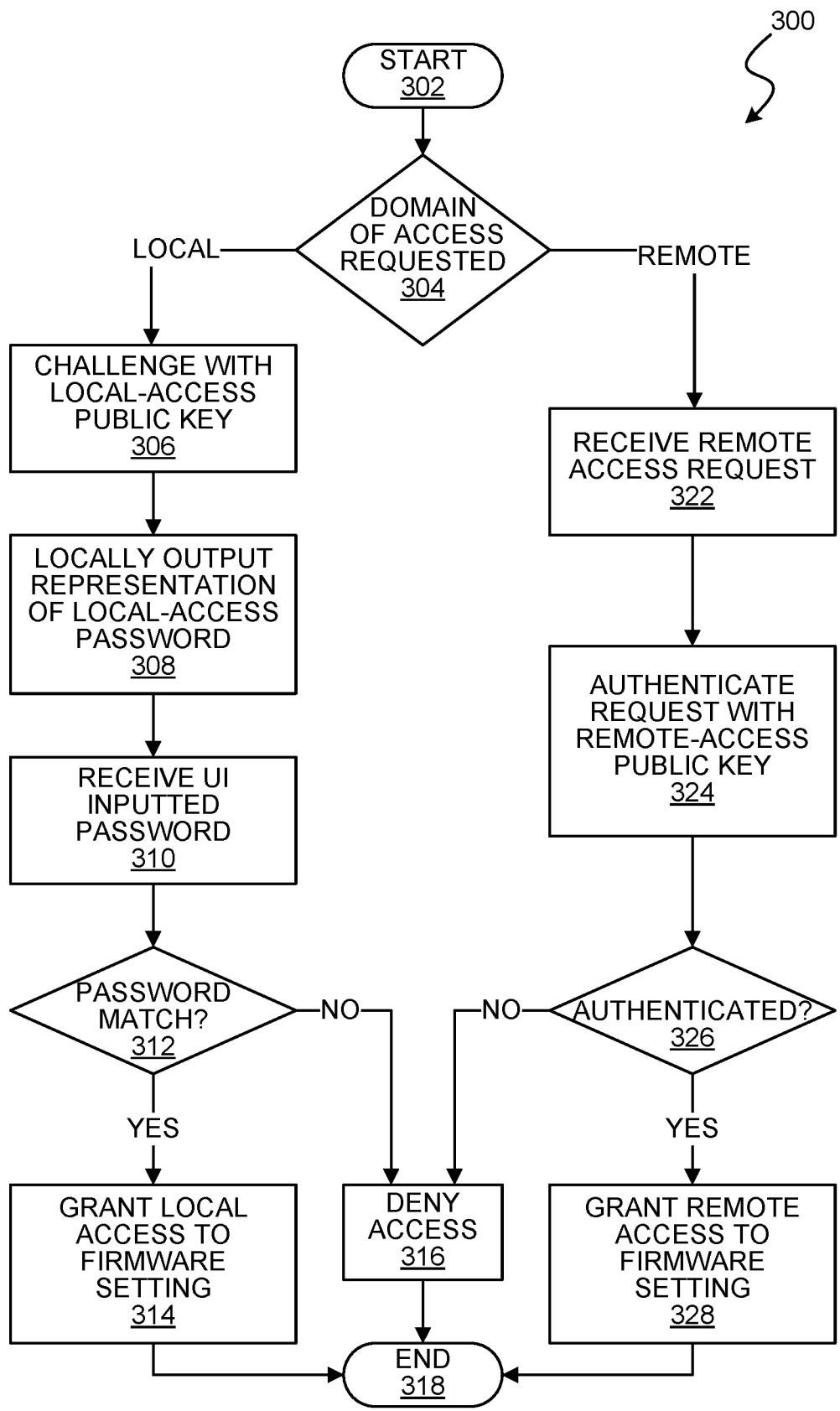
FIG. 3 is a flowchart of an example method of granting access to a firmware setting through a local trust domain and a remote trust domain.

FIG. 3 shows an example method 300 to grant access to a firmware setting of a target computing device through a local trust domain and a remote trust domain. The method 300 may be performed by any of the devices and systems described herein. The method 300 may be embodied by a set of processor-executable instructions that may be stored in a non-transitory computer-readable medium. The method begins at block 302.

At block 304, a domain of requested access to the computing device may be determined. Local domain access may be requested by, for example, a local user pressing a key during boot of the target computing device. Remote domain access may be requested by, for example, a remote user transmitting a request to the target computing device. The determination of the domain of requested access may be used to select either the local-access public key or the remote-access public key for further processing by the method 300.

For local access to the setting, at block 306, a local-access public key is used to generate a challenge. For example, the local-access public key may be used to encrypt a local-access password, such as a random/pseudorandom number or other nonce, to generate a representation of the local-access password.

Then, at block 308, the representation of the local-access password may be outputted locally at a user interface of the target computing device, such as at display device, as the challenge to the local user wanting access. A machine-readable code, such as a QR code, may be used to locally communicate the representation of the local-access password. The machine-readable code may also indicate the public key used to encrypt the password. A QR code may be displayed at the target computing device as an invitation for the local user to use his/her smartphone to capture the QR code. Other examples of localized output of the representation of the local-access password include Bluetooth™ communication, near-field communication (NFC), infrared communication, Wi-Fi, and similar.

At block 310, the local user may input a response to the challenge though the user interface of the target computing device, such as by typing a password generated from decryption of the representation of the local-access password using a local private key. For example, a local user's smartphone, after capturing the QR code, may decode and decrypt the local-access password and display the local-access password to the user, so that the user may type the password into the target computing device.

At block 312, if the inputted password matches the local-access password originally generated at the target computing device, then local access to the firmware setting is granted, at block 314. The user's local presence is proven and the firmware setting may then be changed via the local user interface. Otherwise, access is denied, at block 316.

For remote access to the setting, a request is received at the target computing device from a remote computing device, at block 322. Such a request may be digitally signed by a remote computing device using a corresponding private key and communicated to the target computer device via a computer network. The request may identify a setting and the value to change. The request may also indicate the public key to use by, for example, including an identification of the user behind the request.

At block 324, the target computing device may select an appropriate remote-access public key and authenticate the received remote-access request. Authentication may be confirmation that the requesting user at the remote computing device has access to a private key.

At block 326, if authentication is successful, then remote access to the firmware setting is granted, at block 328. The firmware setting may then be changed. The signed request may contain information to change the setting. In other examples, the setting may be changed though further communication with the remote user's computing device. Otherwise, access is denied, at block 316.

The method 300 ends at block 318 and may be repeated for subsequent access attempts. Repeated failed access attempts may be ignored for a particular user if too many failed attempts occur.

Figure 4:
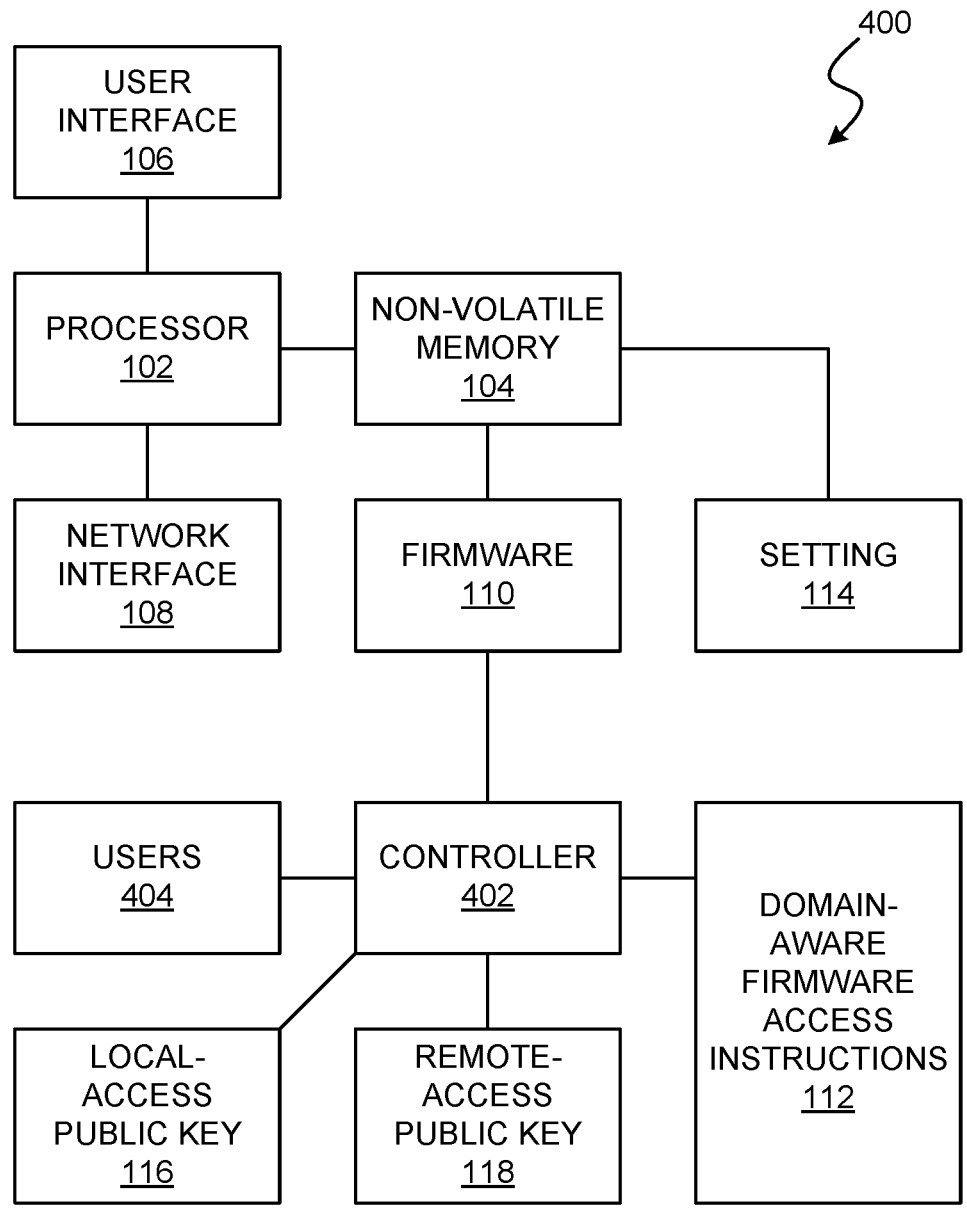
FIG. 4 is a block diagram of an example computing device with a controller to provide local and remote trust domains to access a firmware setting.

FIG. 4 shows an example computing device 400. The computing device 400 may be a desktop computer, server, notebook computer, tablet computer, smartphone, or similar device. The computing device 400 is similar to the other computing devices described herein and only differences will be described in detail, with like references denoting like components.

The computing device 400 includes a controller 402 that is separate from a main processor 102. The controller 402 executes domain-aware firmware access instructions 112 to grant local and remote access to a setting 114 of firmware 110 using respective local-access and remote-access public keys 116, 118.

User information 404, such as usernames or other identify information, may be provided to the controller 402. Different users may be associated with different local and remote keys 116, 118.

The domain-aware firmware access instructions 112, keys 116, 118, and user information 404, may be stored in the same non-volatile memory 104 that stores the firmware 110 or in a different non-volatile memory.

The firmware 110 may provide to the controller 402 user interface and network interface functionality of the user interface 106 and network interface 108.

As such, the controller 402 executing the domain-aware firmware access instructions 112 may cooperate with the firmware 110, as executed by the processor 102, to implement local and remote trust domains for access to a firmware setting 114.

Figure 5:
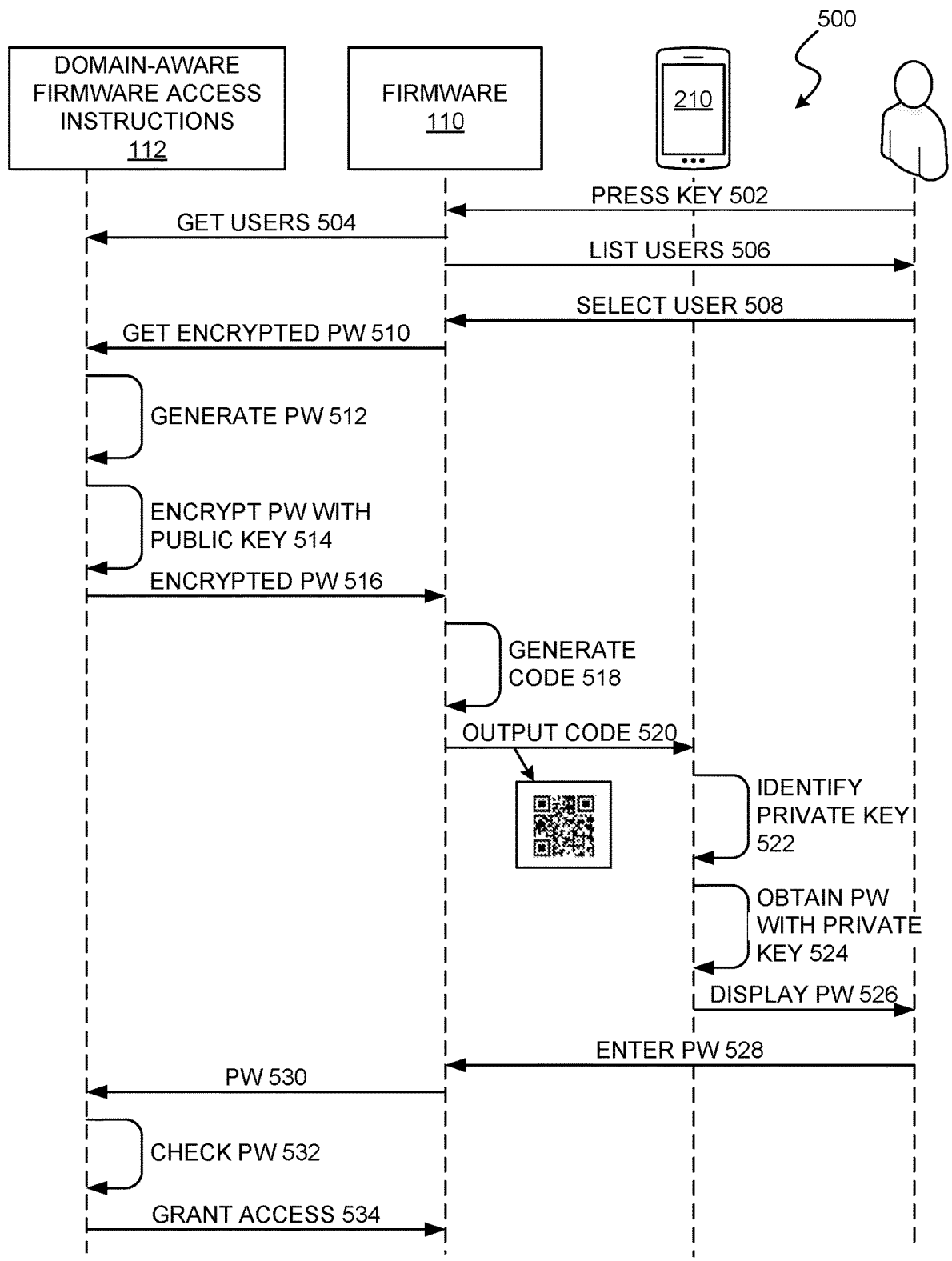
FIG. 5 is a communications diagram of an example method of granting access to a firmware setting through a local trust domain.

FIG. 5 shows an example method 500 of granting access to a firmware setting through a local trust domain. The method 500 may be performed by any of the devices and systems described herein. The method 500 may be embodied by a set of processor-executable instructions that may be stored in a non-transitory computer-readable medium.

A user may press 502 a key of a target computing device to request access to the firmware 110 of the computing device to change a setting of the firmware 110. For example, at boot of the computing device, the user may press an "F10" key to request access the firmware 110.

The firmware 110 may respond to the keypress by obtaining 504 identities of users who may change settings. To do this, the firmware 110 may interact with domain-aware firmware access instructions 112, which may have access to such user identities, such as usernames.

The firmware 110 may then display 506 a list of user identities for the user to select from. The list may be displayed on the display device of the computing device that executes the firmware 110.

The user may then select 508 an appropriate user identity and the firmware 110, in response, may request 510 an encrypted password from the domain-aware firmware access instructions 112.

The instructions 112 may generate 512 a password. The password may be based on a nonce. For example, a password may be generated based on the following formula:

$$password=truncate(HMAC\_SHA256(nonce, time\ counter))$$

where HMAC_SHA256 is hash-based message authentication code or HMAC (e.g., with a cryptographic hash function of 256 bits) that takes a nonce and time counter as arguments. The nonce may be a random/pseudorandom number and the time counter may be a number based on the current date/time at the computing device. The truncation operation may reduce the number of bits in the password to correspond to a suitable number of characters for a local user to enter, such as eight or ten.

The instructions 112 may then encrypt 514 the nonce with a public key that is selected based on the indicated user identity.

The instructions 112 may then communicate 516 a representation of the encrypted password to the firmware 110. This may include providing the encrypted nonce, the time counter, and a hash of the public key used to encrypt the nonce, or similar information to allow the user's portable computing device 210 to reproduce the password if able to access the relevant private key. The original password is kept secret by the instructions 112.

The firmware 110 may then generate 518 a machine-readable code, such as a QR code. The code may communicate information sufficient to reproduce the password, assuming access to the private key, and such information may include the encrypted nonce, the time counter, and a hash of the public key.

The firmware 110 may then output 520 the machine-readable code to a user's portable computing device 210. For example, when the code is a QR code, the firmware may display the code on a display of the target computing device.

The user's portable computing device 210 may thus use the hash of the public key to identify 522 the relevant private key, if available. If the portable computing device 210 has access to the private key, then the portable computing device 210 causes the password generated by the instructions 112 to be reproduced 524 by decrypting the encrypted nonce using the private key, and then using a computation, such as the formula above, to generate the password.

The user's portable computing device 210 may store a private key in memory or may access a private key stored on a server. Private keys may be stored in association with corresponding public keys or hashes thereof, and a private key may be identified using the hash of the public key communicated by the instructions 112. Generation of the password may be performed at the user's portable computing device 210. If the private key is stored at a server, then generation of the password may be performed at the server and the password may be communicated to the user's portable computing device 210.

The portable computing device 210 may output 526 the reproduced password to the user, such as by displaying the password on a display of the portable computing device 210. A password composed of bits is mapped to a sequence of human-typable characters.

The user may then enter 528 the password into the target computing device by, for example, typing the password on a keyboard.

The firmware 110 then communicates 530 the entered password to the instructions 112, which checks 532 the entered password by comparing the entered password to the password originally computed by the instructions 112. When the entered and original passwords match, the instructions 112 instruct the firmware 110 to grant 534 access to the setting.

The user may then change the setting using the keyboard or other user interface device of the computing device.

Figure 6:
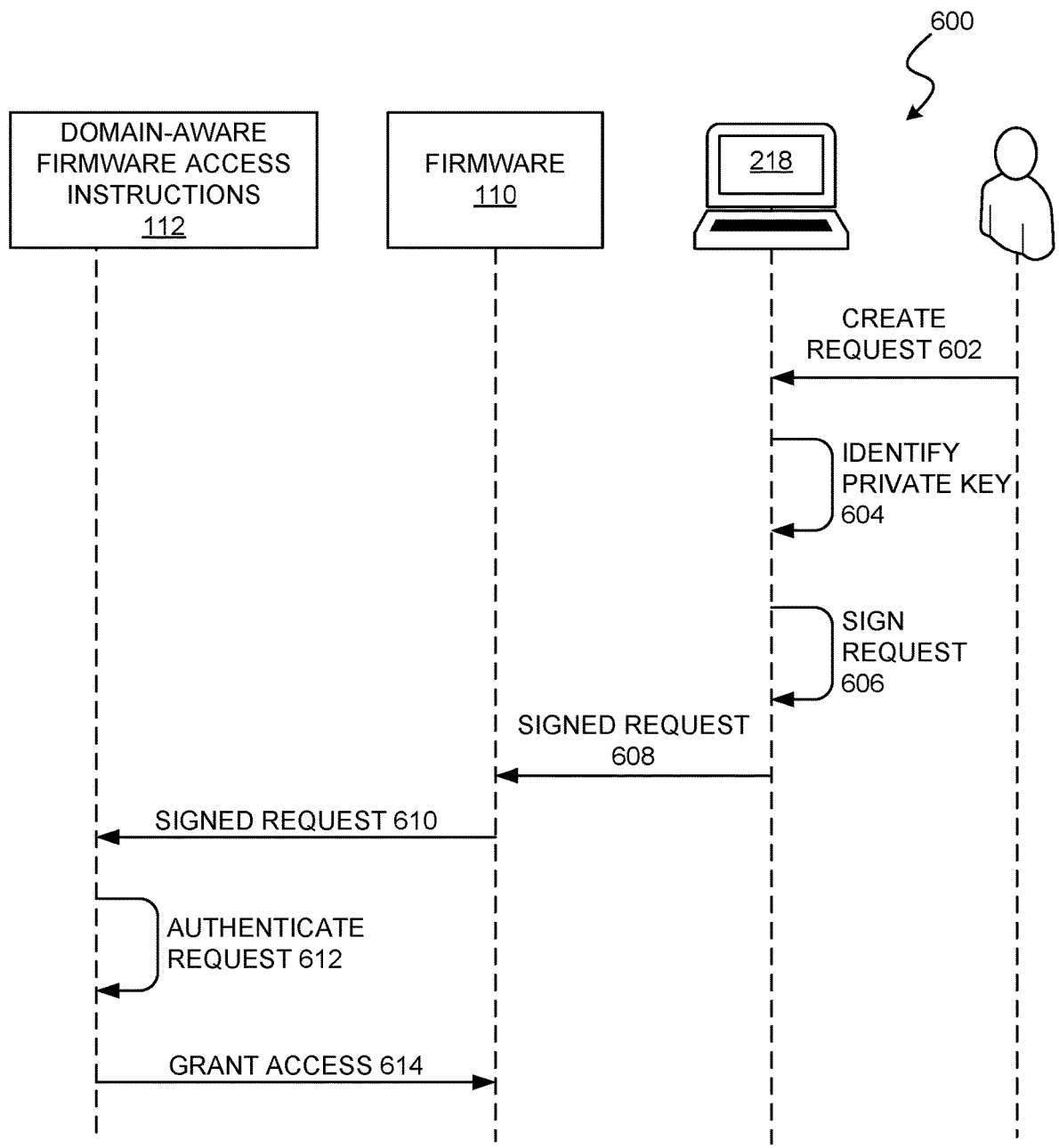
FIG. 6 is a communications diagram of an example method of granting access to a firmware setting through a remote trust domain.

FIG. 6 shows an example method 600 of granting access to a firmware setting through a remote trust domain. The method 600 may be performed by any of the devices and systems described herein. The method 600 may be embodied by a set of processor-executable instructions that may be stored in a non-transitory computer-readable medium.

A user initiates creation 602 of a request to modify a firmware setting of a target computing device. The user is remote from the target computing device and as such uses a remote computing device 218 available to the user. Creation of the request may include the user providing identity information, such as by logging in to an application. The user's identity may be authenticated by a username and password. The request may contain a setting identifier and a value identifier. The setting identifier may identify the firmware setting to be changed, and the value identifier may identify the value to which the firmware setting is to be set.

The remote user's computing device 218 may identify 604 a private key for the user. The private key may be stored locally on the computing device 218 or on a server accessible to the user's remote computing device 218. A private key may be associated with a user's identity information.

The request may then sign 606 using the private key. Signing may be performed at the computing device 218. If the private key is stored at a server, then signing may be performed at the server and the signed request may be communicated to the computing device 218.

The signed request may then be communicated 608 to the firmware 110 of the target computing device. The signed request may be provided, via a computer network, by the remote user's computing device 218 or by a server that signs the request. The firmware 110 may provide network functionality to allow such remote connections.

The firmware 110 may provide 610 the signed request to domain-aware firmware access instructions 112. In other examples, the instructions 112 may provide network functionality to allow remote connections and the signed request may be communicated directly to the instructions 112 by the remote user's computing device 218 or server.

The instructions 112 may use a remote-access public key to authenticate 612 the signed request. The signed request may contain information that identifies the relevant public key to use for authentication. If the request is authenticated, then the instructions 112 may grant access 614 to the setting indicated in the request. A change to the setting contained in the request may be automatically carried out.

Figure 7:
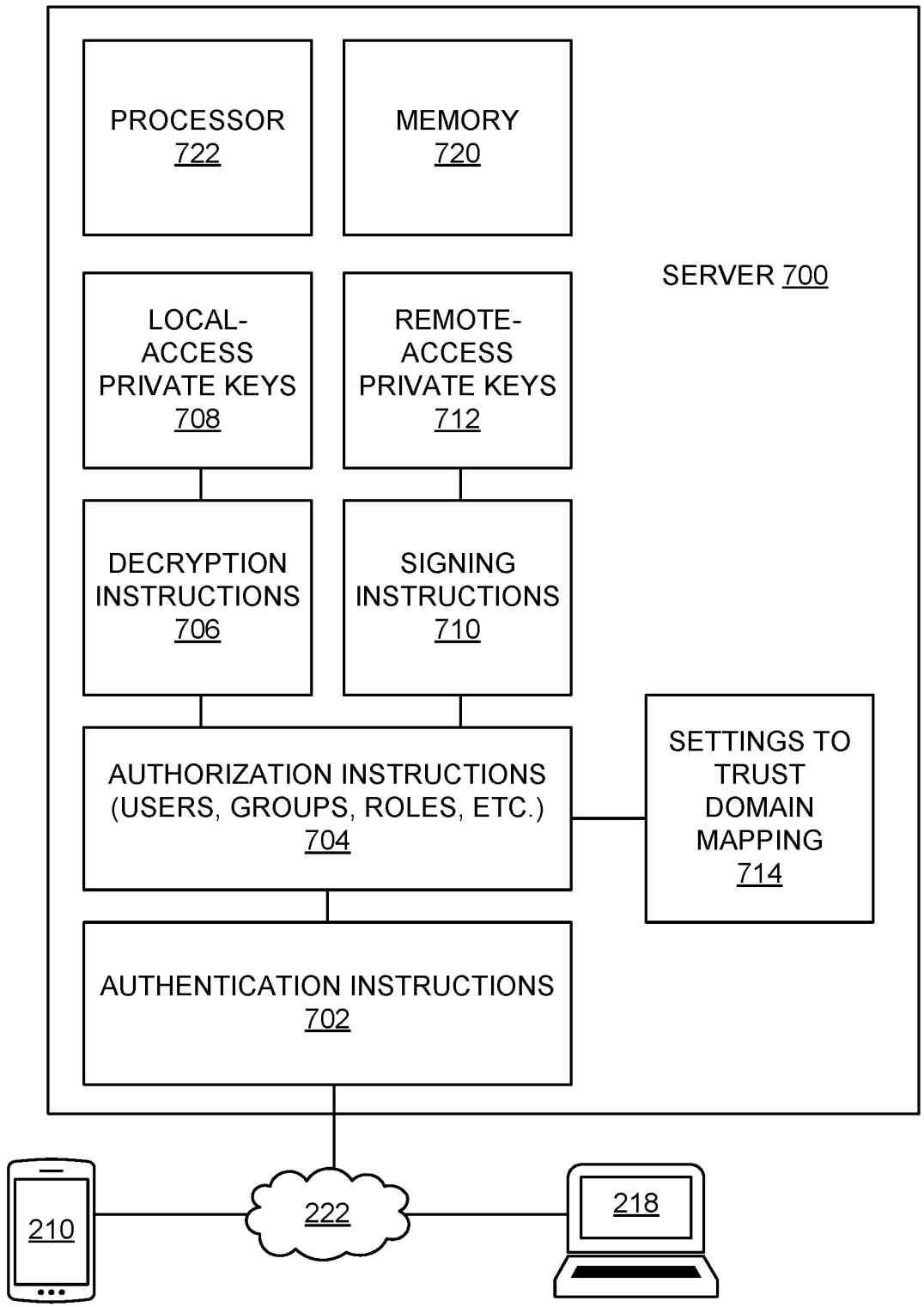
FIG. 7 is a schematic block diagram of an example server to establish a local trust domain and a remote trust domain for access to firmware settings.

FIG. 7 shows an example server 700 to establish a local trust domain and a remote trust domain for access to firmware settings. The server 700 may be used with any of the device, systems, and methods described herein.

The computing devices 210, 218 may connect to the server 700 via a computer network 222. The server 700 may receive requests from computing devices 210, 218 such as a smartphone used by tech local to computing devices whose firmware are to have settings modified, a notebook computer 218 used by a remote tech, and similar. Requests may include requests to decrypt a nonce or other local-access information and to respond with a password to grant local access to a firmware setting. Requests may include requests to sign a proposed firmware setting change and provide a response that include the signed change.

The server 700 includes memory 720 and a processor 722 to cooperate to store and execute instructions, as well as store relevant data.

The server 700 may include authentication instructions 702 to authenticate a user of a computing device 210, 218 as someone who is allowed to make changes to firmware of a target computing device. The authentication instructions 702 may implement username and password authentication methodology, a certificate-based authentication methodology, or similar. A user who fails to authenticate may be denied access to the server and may thus be prevented from making a change to a firmware setting of a target computing device.

The server 700 may include authorization instructions 704 to authorize authenticated users to perform specific firmware settings changes to target computing devices. Authorization instructions 704 may reference a permissions matrix that mutually associates users, user roles, user groups, user proximity (remote or local), computing devices, computing device groups, firmware settings, and/or similar information. For example, a specific user, specific user role, or specific user group may be given permission to make a remote or local modification to a firmware setting of a specific computer or group of computers. A request to change a firmware setting may include information sufficient to evaluate whether or not the user is authorized to make the change. A user who provides a request to change a firmware that is not authorized may be prevented from making the requested change to the firmware setting.

The authorization instructions 704 are to identify whether a requesting user is authorized to make a particular firmware setting change and, if authorized, to obtain information from the request that may identify a suitable private key to use for decryption (i.e., local access) or digital signing (i.e., remote access). A target computing device whose firmware setting is to be changed may have a unique public key, may share a public key with a workgroup, or similar.

Firmware settings may be assignable to the local trust domain, the remote trust domain, or both the local and remote trust domains. This information may be stored in a settings to trust domain mapping 714 that maps different firmware settings to either or both of the local and remote trust domains. The authorization instructions 704 may reference the trust domain mapping 714 to determine whether local or remote access should be granted for a requested change to a particular firmware setting.

With regard to the local trust domain and requests to make local firmware settings changes, the server 700 may further include decryption instructions 706 to decrypt a nonce or other local-access information provided to a requesting user's computing device 210 as part of a local challenge. The decryption instructions may use a local-access private key selected from a plurality of local-access private keys 708 stored at the server 700. A suitable local-access private key may be selected using information provided in a specific challenge, such as a hash of a public key, and communicated to the server 700 as part of a request. The local-access private keys 708 may be stored in association with local-access public keys or hashes thereof.

With regard to the remote trust domain and requests to make remote firmware settings changes, the server 700 may further include signing instructions 710 to digitally sign firmware settings changes. A plurality of remote-access private keys 712 may be stored at the server 700. A suitable remote-access private key may be selected using information provided with a request to make a specific firmware setting change.

The local-access private keys 708 and remote-access private keys 712 may be different sets of keys that are stored and used separately. This may reduce the risk of a compromised key from one trust domain (e.g., remote) being used for unauthorized access to the other trust domain (e.g., local).

The instructions 702, 704, 706, 710 may be a set of instructions stored in memory, such as the memory 720, or a set of instructions having parts in different memories.

It should be apparent from the above that local and remote trust domains may be established to provide secure access to firmware settings of target computing devices. Distinct and different local and remote trust domains may be used to adjust firmware settings of target computing devices, thereby allowing greater flexibility in the management of firmware settings. Moreover, separate local and remote trust domains with different private keys and different access methodologies reduce a likelihood that a compromised private key of one domain could be used to create or expand a security breach via the other domain.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A computing device comprising:
a user interface;
a network interface;
a non-volatile memory;
a processor coupled to the user interface, the network interface, and the non-volatile memory;
a first set of instructions stored in the non-volatile memory, wherein the first set of instructions, when executed by the processor, causes the processor to:
perform a hardware initialization of the computing device according to a firmware setting of the computing device; and
a second set of instructions stored in the non-volatile memory, wherein the second set of instructions, when executed by the processor, causes the processor to:
establish a local trust domain for the computing device;
establish, for a remote device, a remote trust domain that is isolated from the local trust domain;
in response to a request received via the user interface of the computing device for local access to the firmware setting of the computing device, use a local-access public key within the local trust domain to issue a challenge via the user interface to grant the computing device secure local access to the firmware setting; and
in response to a request from a remote computing device for remote access to the firmware setting of the computing device, use a remote-access public key within the remote trust domain instead of the local-access public key to grant the remote computing device secure remote access to the firmware setting of the computing device via the network interface.

2. The computing device of claim 1, wherein the user interface comprises a display device, and wherein to use the local-access public key to issue the challenge via the user interface, the second set of instructions, when executed by the processor, further causes the processor to:
output a representation of a dynamically generated local-access password encrypted with the local-access public key as a machine-readable code on the display device; and
grant secure local access to the firmware setting via the user interface in response to receipt of a password matching the dynamically generated local-access password.

3. The computing device of claim 2, wherein the machine-readable code is a graphical rendering.

4. The computing device of claim 1, wherein to use the remote-access public key to grant the remote computing device secure remote access to the firmware setting, the second set of instructions, when executed by the processor, further causes the processor to:
determine that the request from the remote device is a signed request; and
grant secure remote access to the firmware setting of the computing device via the network interface in response to authenticating the signed request with the remote-access public key.

5. The computing device of claim 1, wherein the first set of instructions, when executed by the processor, further causes the processor to perform a hardware initialization of the computing device according to a plurality of firmware settings, wherein each firmware setting of the plurality of firmware settings is assignable to the local trust domain, the remote trust domain, or both the local trust domain and the remote trust domain.

6. A computing device comprising:
a user interface;
a network interface;
a non-volatile memory to store a set of instructions and firmware, wherein the firmware performs a hardware initialization of the computing device according to a plurality of firmware settings; and a processor coupled to the user interface, the network interface, and the non-volatile memory, wherein the set of instructions, when executed by the processor, causes the processor to:
establish a local trust domain for the computing device;
establish, for a remote device, a remote trust domain that is isolated from the local trust domain;
determine whether a request to change a firmware setting of the plurality of firmware settings is from a remote device or the computing device;
if it is determined that the request to change the firmware setting is from the remote device:
authenticate the request from the remote device to grant the remote device secure remote access within the remote trust domain to change the firmware setting of the plurality of firmware settings of the computing device via the network interface; and
if it is determined that the request to change the firmware setting is from the computing device:
issue a challenge via the user interface of the computing device to grant secure local access within the local trust domain to change the firmware setting.

7. The computing device of claim 6, wherein if the request is determined to be from the remote device and is a digitally signed request, the set of instructions, when executed by the processor, further causes the processor to grant secure remote access to the firmware setting by authenticating, in the remote trust domain, the digitally signed request to change the firmware setting.

8. The computing device of claim 6, wherein if the request is determined to be from the computing device, the set of instructions, when executed by the processor, further causes the processor to grant secure local access to the firmware setting by determining, in the local trust domain, that a response to the challenge received via the user interface meets the challenge.

9. The computing device of claim 6, wherein:
a remote-access public key is associated with the remote trust domain,
a local-access public key is associated with the local trust domain, and
the remote-access public key is different than the local-access public key.

10. The computing device of claim 9, wherein if the request is determined to be from the remote device, the set of instructions, when executed by the processor, further causes the processor to:
select the remote-access public key associated with the remote trust domain; and
authenticate the request from the remote device with the remote-access public key to grant the remote device secure remote access to change the firmware setting.

11. The computing device of claim 9, wherein if the request is determined to be from the computing device, the set of instructions, when executed by the processor, further causes the processor to:
select the local-access public key associated with the local trust domain; and
generate, with the local-access public key, the challenge issued via the user interface to grant the computing device secure local access to change the firmware setting.

12. The computing device of claim 6, wherein each firmware setting of the plurality of firmware settings is assignable to the local trust domain, the remote trust domain, or both the local trust domain and the remote trust domain.

13. A computing device comprising:
a memory to store a set of instructions to authenticate a request to change a firmware setting of a target computing device;
a processor coupled to the memory, wherein the set of instructions, when executed by the processor, causes the processor to:
determine whether the request is a local request from a local computing device physically present at the target computing device or whether the request is a remote request from a remote computing device connected to the target computing device via a computer network, wherein the local computing device and the target computing device are within a local trust domain, wherein the target computing device and the remote computing device are within a remote trust domain, and wherein the local trust domain is isolated from the remote trust domain;
if it is determined that the request to change the firmware setting is a local request from the local computing device:
generate a password based on information in the request, wherein the password is provided to the target computing device in the local trust domain, and wherein the target computing device uses the password to issue a challenge to the local computing device in the local trust domain, and wherein the target computing device uses a response to the challenge to grant the local computing device secure local access to the firmware setting of the target computing device; and
if it is determined that the request to change the firmware setting is a remote request from the remote computing device:
generate, from the request, a signed request, wherein the signed request is provided instead of the password to the target computing device in the remote trust domain, and wherein the target computing device uses the signed request to grant the remote computing device secure remote access to the firmware setting of the target computing device via the computer network.

14. The computing device of claim 13, wherein it is determined that the request to change the firmware setting is from the local computing device, and wherein to generate the password, the set of instructions, when executed by the processor, further causes the processor to:
generate the password by decrypting information in the request using a local-access public key.

15. The computing device of claim 13, wherein it is determined that the request to change the firmware setting is from the remote computing device, and wherein to generate the signed request, the set of instructions, when executed by the processor, further causes the processor to:
sign the request using a remote-access public key.

* * * * *